United States Patent [19]
Ishikawa et al.

[11] Patent Number: 6,157,737
[45] Date of Patent: Dec. 5, 2000

[54] METHOD OF AND APPARATUS FOR IMAGE PROCESSING

[75] Inventors: Atsushi Ishikawa, Okazaki; Junji Nishigaki, Toyokawa; Hiroshi Sugiura, Aichi-Ken; Shinji Yamamoto, Toyohashi, all of Japan

[73] Assignee: Minolta Co., Ltd., Osaka, Japan

[21] Appl. No.: 09/054,210

[22] Filed: Apr. 2, 1998

[30]  Foreign Application Priority Data

Apr. 4, 1997 [JP] Japan .................................. 9-086157
Apr. 4, 1997 [JP] Japan .................................. 9-086158
Apr. 4, 1997 [JP] Japan .................................. 9-086159

[51] Int. Cl.[7] ...................................................... G06K 9/00
[52] U.S. Cl. ............................................ 382/195; 382/307
[58] Field of Search ................................. 382/195–205, 382/307–308

[56]  References Cited

U.S. PATENT DOCUMENTS 4,868,752  9/1989  Fuji et al. ............................ 364/424.02
5,430,810  7/1995  Saeki .......................................... 382/281
5,790,403  8/1998  Nakayama ........................... 364/424.033
5,892,855  4/1999  Kakinami et al. ........................ 382/291
5,901,240  5/1999  Luo et al. ................................ 382/132

FOREIGN PATENT DOCUMENTS 5-002648  1/1993  Japan .

*Primary Examiner*—Thomas D. Lee
*Assistant Examiner*—Stephen Brinich
*Attorney, Agent, or Firm*—Sidley & Austin

[57]  ABSTRACT

According to the method of and apparatus for image processing, feature information of each picture element is extracted from image data received. An attribute of each picture element is determined on the basis of the aforesaid feature information. These attributes are corrected by detecting straight lines by applying a Hough transform to picture elements disposed along apparent border lines by which one attribute is divided from another, dividing the image data into a plurality of local regions by these straight lines, and determining an attribute with respect to each of the local regions. Each of the local regions is subjected to image processing in accordance with the corrected attribute.

22 Claims, 19 Drawing Sheets

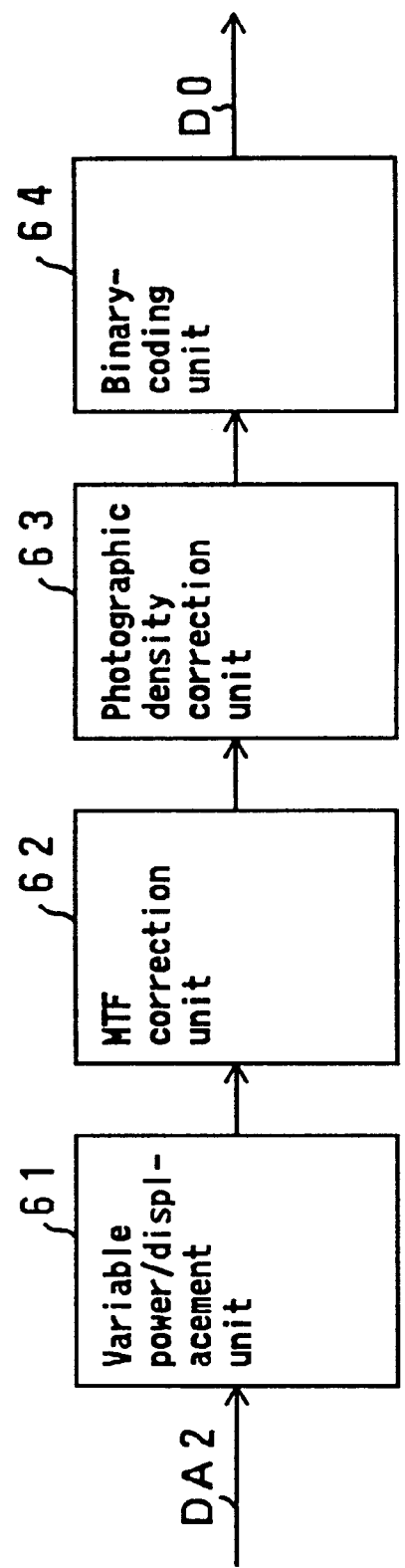

Seven sine curves on ρ-θ plane

Seven points on x-y plane

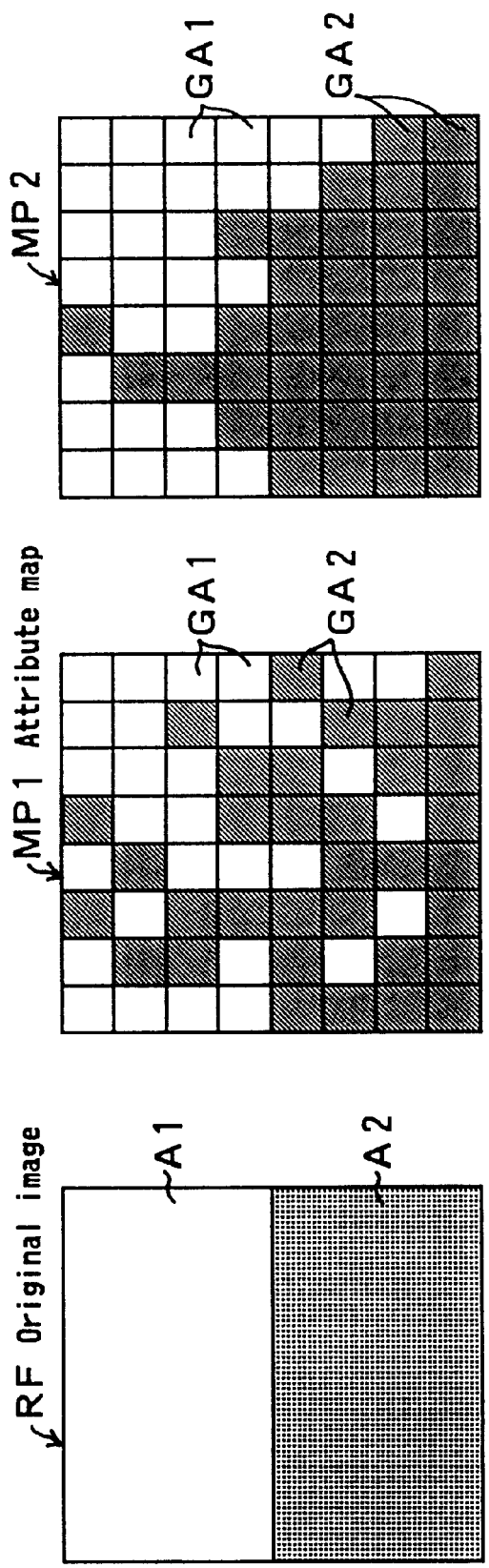

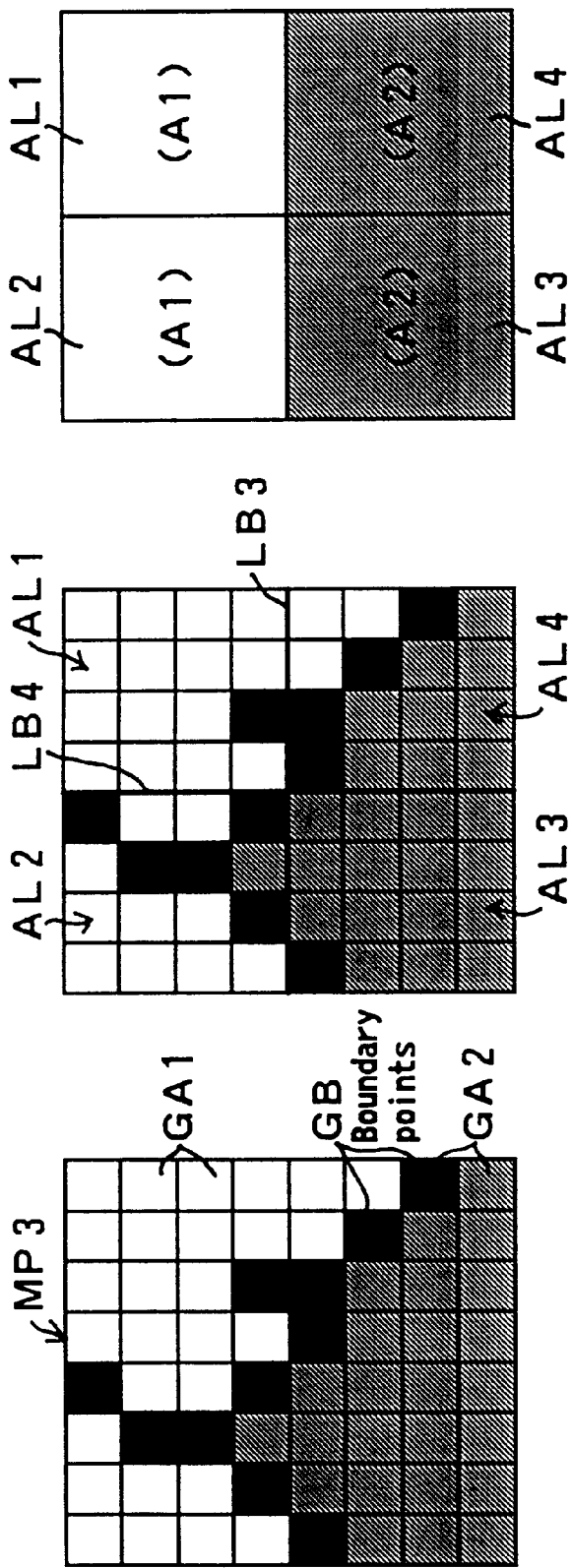

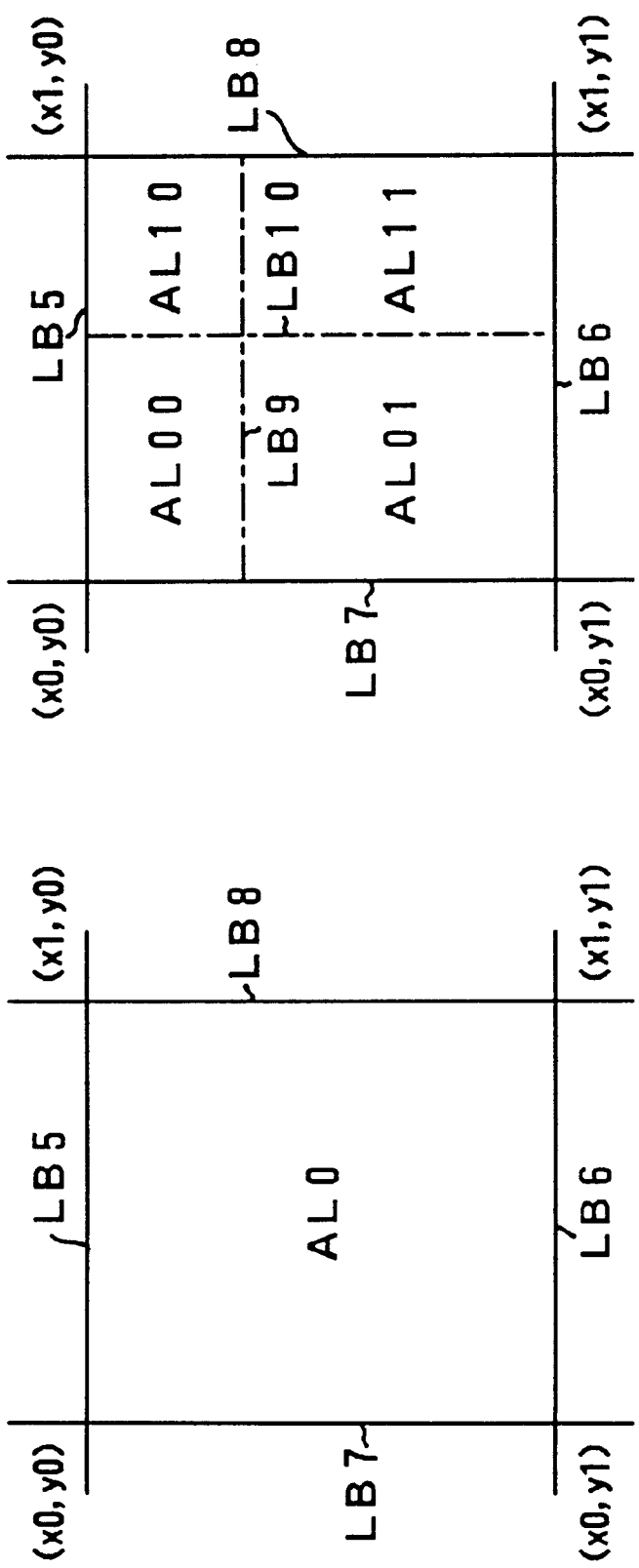

METHOD OF AND APPARATUS FOR IMAGE PROCESSING

BACKGROUND OF THE INVENTION

This application is based on Japanese Patent Application No. 09-086157 filed on Apr. 4, 1997, No. 09-086158 filed on Apr. 4, 1997, and No. 09-086159 filed on Apr. 4, 1997, the contents of which are incorporated herein by reference.

1. Field of the Invention

This invention relates to an image processor in which a mixture of various images appearing in an original document and respectively having different attributes such as dots, characters and photographs can be adequately subjected to image processing in accordance with the respective attributes of images. This invention will be found particularly advantageous when used in a digital copying machine.

2. Description of the Prior Art

In reproducing an original document of the kind indicated above, it has been found extremely desirable to process various images in accordance with the attributes of respective images.

For this purpose, it is essential that a plurality of regions appearing in an original document and respectively having images different in attributes be correctly determined and discriminated from each other.

It is known to determine the attribute of each picture element on the basis of a difference in photographic density, on the basis of a difference between the highest photographic density and the lowest photographic density, or on the basis of information obtained from a histogram illustrating the distribution of photographic densities. It is also known to determine the attribute of one region on the basis of spatial frequency spectra. A neural information processing system has been used heretofore for the purpose of such determination.

Misjudgment is likely to occur in the aforesaid known methods, because they involve the determination of each picture element in an image or the determination of a small region from other small regions.

More specifically stated, a region actually occupied by a single attribute is likely to be mistaken for a region in which a plurality of attributes lie adjacent to one another. Deteriorated picture quality will be caused by image processing based on such misjudgment.

SUMMARY OF THE INVENTION

The primary object of the invention is to provide a method of and an apparatus for image processing in which a plurality of regions appearing in an original document and respectively having images different in attributes, can be correctly determined. For the purpose of such determination, border lines by which one image is separated from another are extracted. Thereby, each region can be adequately subjected to image processing in accordance with an attribute prevailing in that region.

The method includes the steps of extracting the feature information of each picture element from image data received, determining the attribute on the basis of the feature information, detecting straight lines by applying a Hough transform to picture elements disposed along apparent border lines by which one attribute is separated from another, dividing the image data into a plurality of local regions by the straight lines, correcting the attribute by determining it with respect to each of the local regions, and subjecting each of the local regions to image processing in accordance with the corrected attribute.

In one described embodiment, a Hough transform is applied only to dots and photographs, while processing other than a Hough transform is applied to characters.

BRIEF DESCRIPTION OF THE DRAWINGS

FIG. 5 is a block diagrammatic representation of an image revise unit;

FIGS. 7A, 7B, 7C, 8A, 8B, and 8C are illustrative of processing that the attribute corrector is adapted to carry out;

FIGS. 10A and 10B are views useful in understanding the method of subdividing a local region;

DETAILED DESCRIPTION

Figure 1:
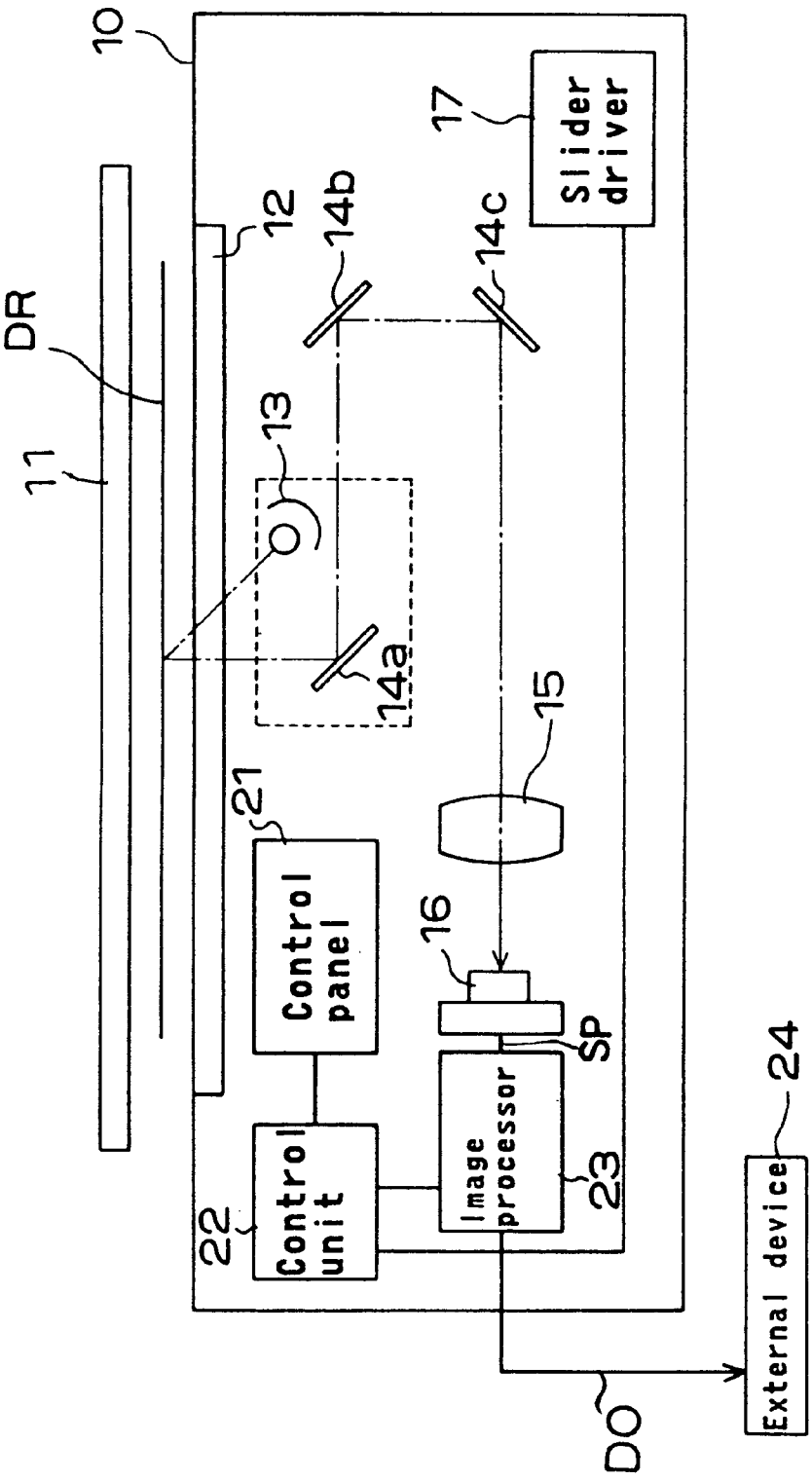
FIG. 1 is a view showing the component parts of an apparatus for reading images, said apparatus incorporating a first preferred embodiment of the inventive image processor.

Referring now to FIG. 1, an apparatus 1 for reading images, as here illustrated as one construction incorporating a first preferred embodiment of the inventive image processor 23, comprises a main body 10, cover 11, glass plate 12, lamp 13, mirrors 14a, 14b and 14c, lens 15, CCD image sensor 16, slider driver 17, control panel 21 and control unit 22.

Imaging of a document DR is achieved using the lamp 13 which illuminates the document DR on the glass plate 12. Light rays reflected from the document DR are allowed to strike the mirrors 14a, 14b and 14c, reflected to the lens 15, and directed to the CCD image sensor 16, on which an image of the document DR is formed.

The lamp 13 and the mirrors 14a, 14b and 14c are mounted on a slider (not shown). The slider is connected with the slider driver 17 which serves to displace the slider in the horizontal direction so as to allow the whole surface of the document DR to be scanned. The speed of the slider depends on the desired expansion or reduction ratio.

When the light rays reflected from the document DR are incident on the CCD image sensor 16, they are converted into picture signals SP and fed to the image processor 23, in which the picture signals SP are subjected to analog signal processing, analog-to-digital (A/D) conversion and digital image processing. Image data DO outputted from the image processor 23 is fed to an external device 24 such as a printer or image memory.

Figure 2:
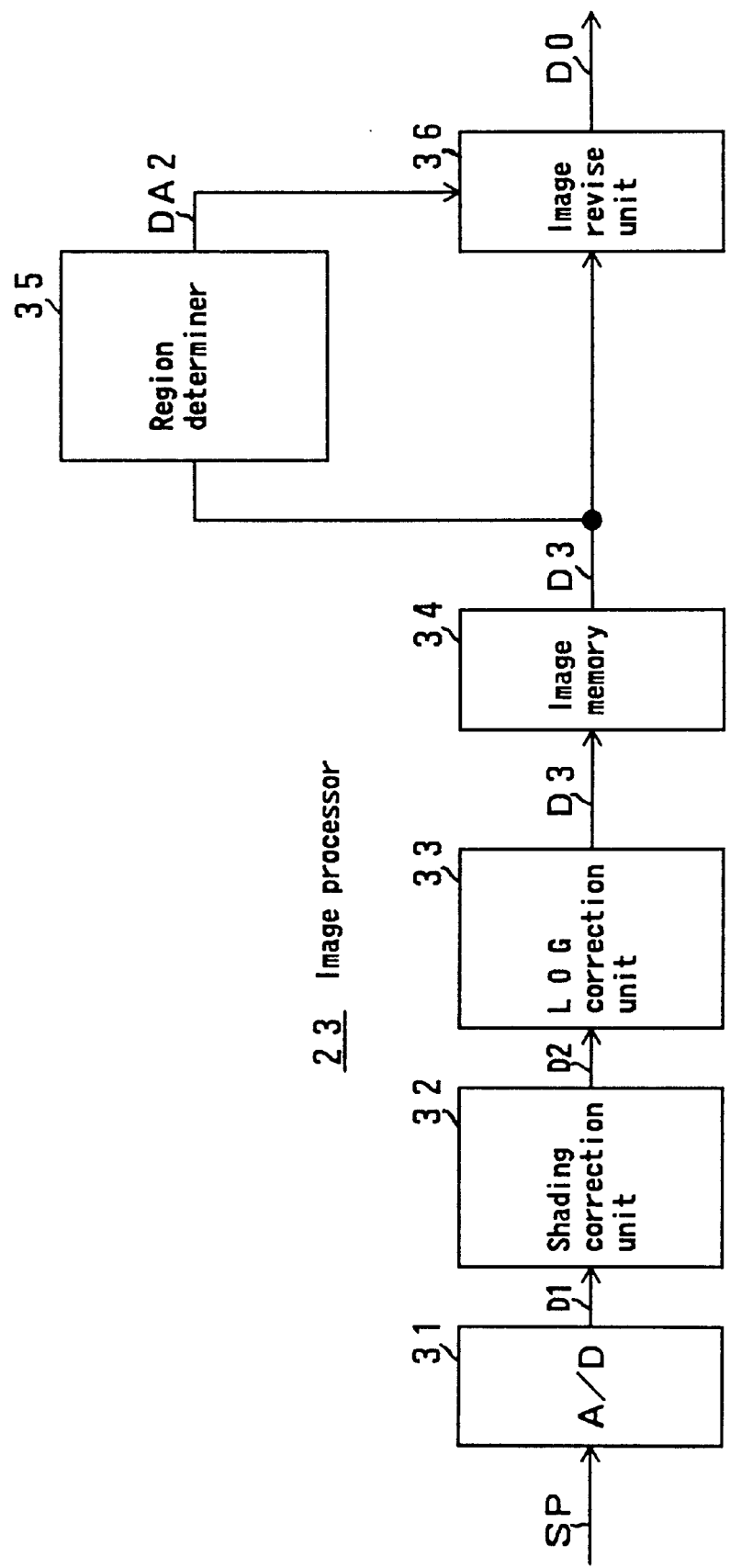
FIG. 2 is a block diagrammatic representation of the image processor.

Referring now to FIG. 2, the image processor 23 comprises an A/D converter 31, shading correction unit 32, LOG correction unit 33, image memory 34, region determiner 35 and image revise unit 36.

The picture signal SP outputted from the CCD image sensor 16 is converted by the A/D converter 31 into image data D1 which is a digital signal. Image data D1 is fed, through the shading correction unit 32 and the LOG correction unit 33, to the image memory 34 and stored therein as image data D3, on the basis of which the region determiner 35 determines the attribute of a local region and outputs information DA2 on the attributes of local regions. The image revise unit 36 makes a switchover of parameters in accordance with the results of determination carried out in the region determiner 35 so that the image data D3 may be subjected to image processing in such a manner as appropriate in view of the attribute of each local region.

Figure 3:
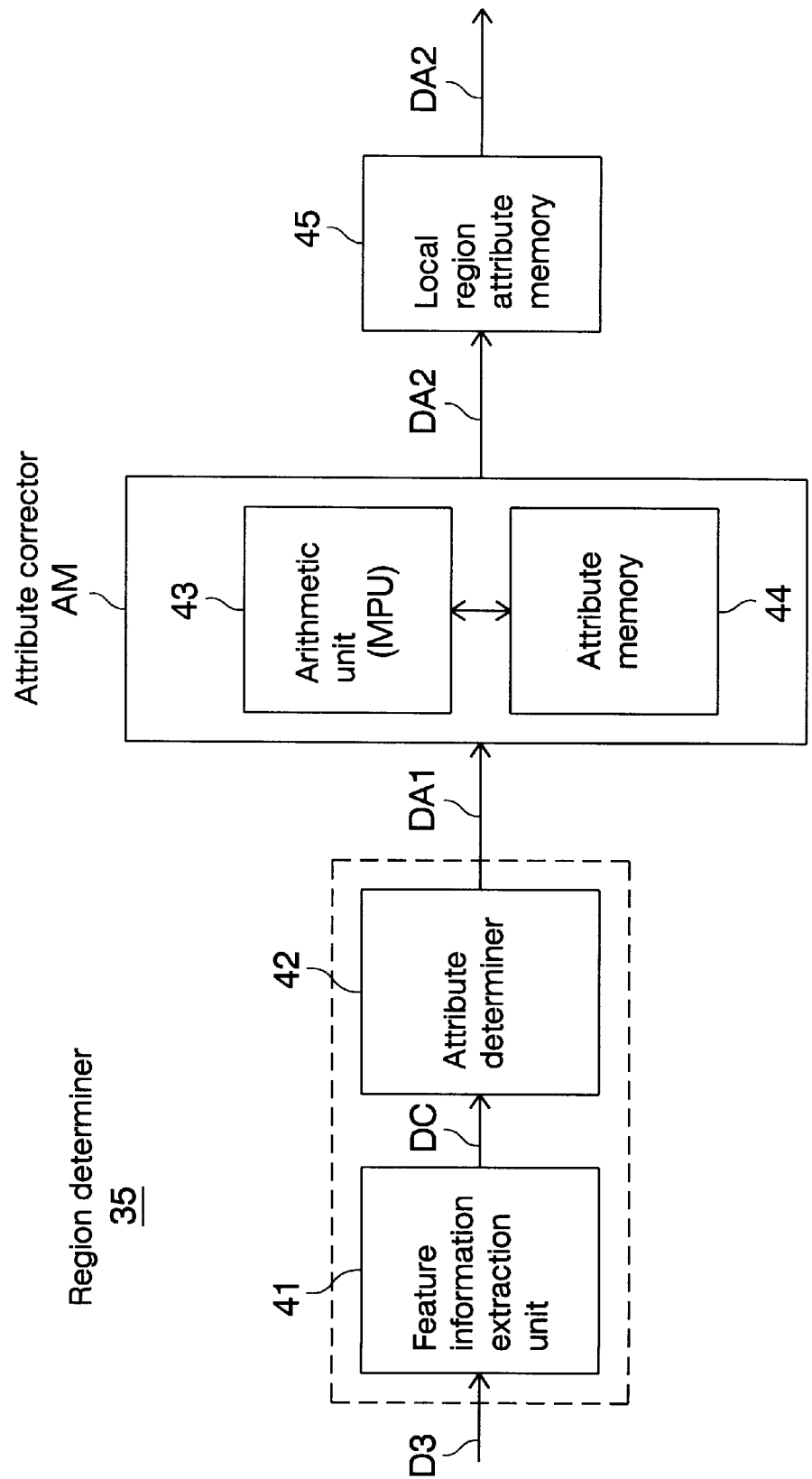
FIG. 3 is a block diagrammatic representation of a region determiner.

Referring now to FIG. 3, the region determiner 35 comprises a feature information extraction unit 41, attribute determiner 42, arithmetic unit 43, attribute memory 44 and local region attribute memory 45.

The feature information extraction unit 41 extracts the feature information DC of each picture element from the image data D3. A Laplacian filter may be suitable for use as the feature information extraction unit 41. The attribute determiner 42 determines the attribute of each picture element on the basis of the feature information DC and outputs information DA1 on the attributes of picture elements. The information DA1 is stored in the attribute memory 44.

The arithmetic unit 43 performs arithmetic operations, on the basis of the information DA1, for determining the attribute of a local region and outputs the aforesaid information DA2 on the attributes of local regions. More specifically stated, the information DA1 is used in detecting straight lines by applying a Hough transform to picture elements disposed along apparent border lines by which one attribute is separated from another, dividing the image data D3 into a plurality of local regions by the straight lines, and determining the attribute with respect to each of the local regions. Thus the aforesaid information DA2 on the attributes of local regions is obtained. The information DA2 is stored in the local region attribute memory 45. The arithmetic unit 43 and the attribute memory 44 constitute an attribute corrector AM, which comprises a microprocessing unit or a central processing unit of the necessary capabilities in accordance with the skill of the art and a semiconductor memory or any other storage medium. A neural information processing system may also be suitable for use as the attribute corrector AM.

Figure 4:
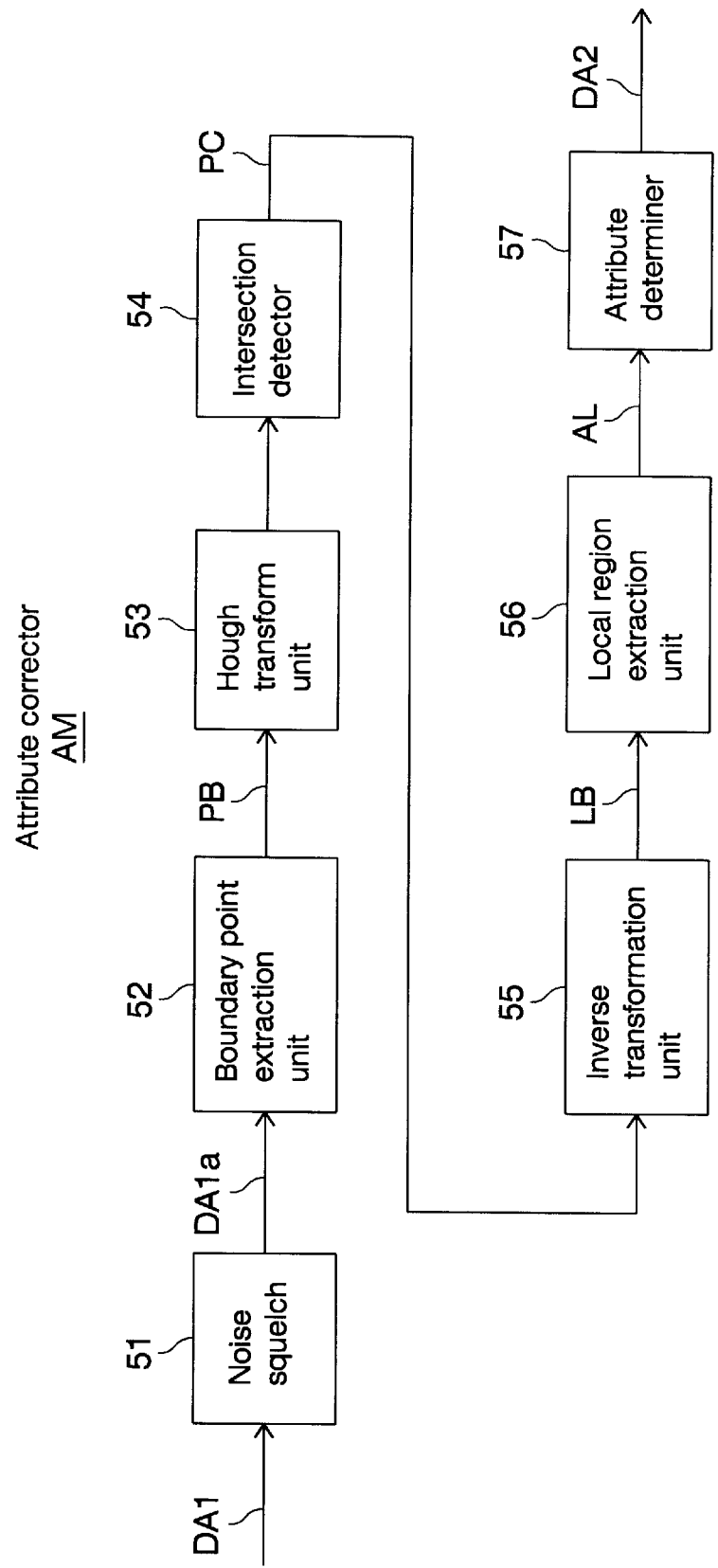
FIG. 4 is a block diagrammatic representation of an attribute corrector.

FIG. 4 shows functional relationships between the parts of which the arithmetic unit 43 shown in FIG. 3 consists.

The arithmetic unit 43 incorporated in the attribute corrector AM comprises a noise squelch 51, boundary point extraction unit 52, Hough transform unit 53, intersection detector 54, inverse transformation unit 55, local region extraction unit 56 and attribute determiner 57.

The noise squelch 51 minimizes or eliminates noise contributed to the information DA1 on the attributes of picture elements. More specifically stated, the regions of small images contained in candidate regions for dots and photographs are deleted. A nonlimiting example of those to be deleted is a region of lesser area than a 14-point type. Information DA1a on the attributes of picture elements results from this deletion.

By the expression "boundary points," as used herein, is meant the picture elements disposed along an apparent border line by which one attribute is divided from another. The boundary point extraction unit 52 extracts boundary points PB from the information DA1a. The boundary points PB thus extracted are in an orthogonal coordinate plane. The Hough transform unit 53 applies a Hough transform to these boundary points PB so as to allow a plurality of curves in the polar coordinate plane to result from this transformation. The intersection detector 54 detects the points PC in which these curves intersect. The inverse transformation unit 55 inversely transforms the points PC into straight lines in the orthogonal coordinate plane so as to produce border lines LB therein. The local region extraction unit 56 extracts a rectangular local region AL enclosed with the border lines LB.

The attribute determiner 57 determines the attribute of a local region AL and outputs information DA2 on the attributes of local regions. The attributes of picture elements are used for determining the attribute of a local region AL. For example, a local region AL is represented by a specific attribute if 50% or more of picture elements contained in that local region AL have that specific attribute in common. If the attributes of picture elements contained in a local region AL can be classified into three groups or more, the local region AL is represented by an attribute which is ascribable to the largest number of picture elements. A particular advantage obtainable therefrom resides in the fact that the quantity of data to be processed for determining the attribute of a local region AL can be minimized so that the time required for data processing may be greatly lessened.

Referring now to FIG. 5, the image revise unit 36 comprises a variable power/displacement unit 61, MTF correction unit 62, photographic density correction unit 63 and binary-coding unit 64. Parameters for processing data in these components are set on the basis of the information DA2 outputted from the region determiner 35 so that the image data may be subjected to image processing in such a manner as appropriate in view of the attribute of each local region AL. For example, characters, photographs and dots are subjected to edge sharpening, smoothing and filtering respectively.

The manner in which the region determiner 35 produces the information DA1 and DA2 will now be described. Specific reference is now made to the Hough transform.

Figure 6B:
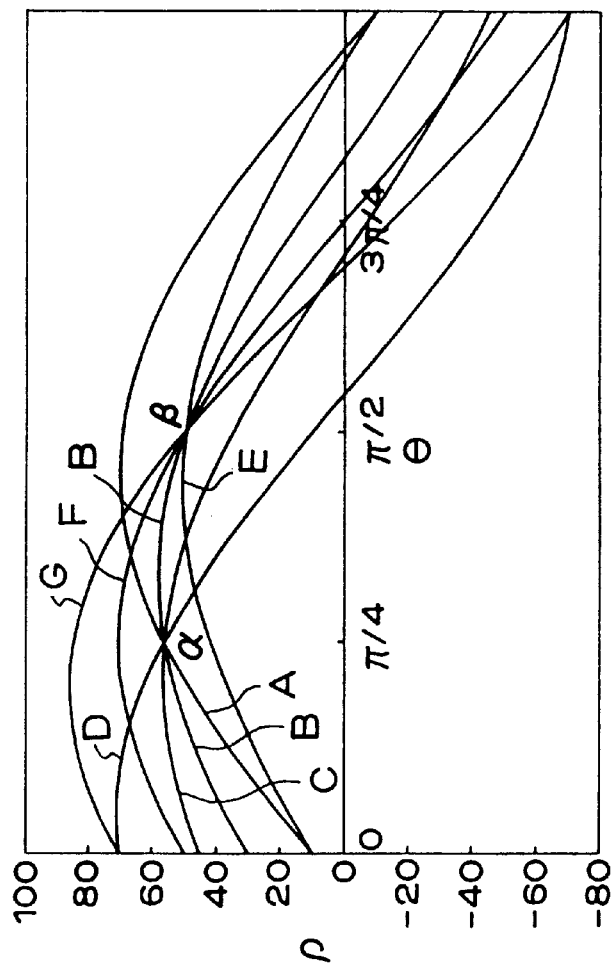
FIGS. 6A and 6B are illustrative of a Hough transform that the region determiner is adapted to carry out.
Figure 6A:
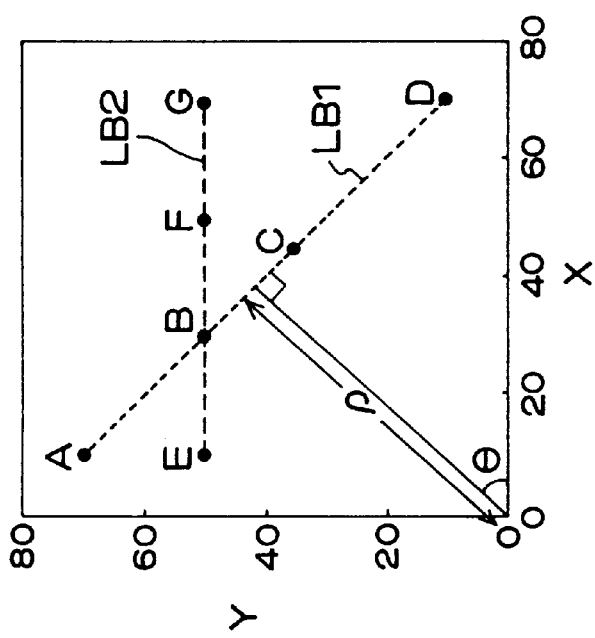

The principle of the Hough transform is represented by the diagrams of FIGS. 6A and 6B, in which seven points A to G lying on an x-y plane (i.e. an orthogonal coordinate plane) are transformed into seven sine curves lying on a $\rho$-$\theta$ plane (i.e. a polar coordinate plane).

The Hough transform is suitable for use in detecting a straight line, circle or ellipse from an image. At the present time, the detection of a straight line is usually effected by a method described by Duda and Hart, to which the method employed in this embodiment is substantially similar. In this method, a straight line can be expressed as:

$$\rho = x \cos \theta + y \sin \theta \quad (1)$$

where $\rho$ is the length of a perpendicular drawn from the origin to the straight line, and $\theta$ is an angle made by the perpendicular with the X axis.

For example, the locus of the point A $(x_0, y_0)$ lying on the x-y plane is a sine curve which lies on the $\rho$-$\theta$ plane and is expressed as $\rho = x_0 \cos \theta + y_0 \sin \theta$ in accordance with equation (1).

Conversely, a sine curve lying on the $\rho$-$\theta$ plane can be transformed into any straight line that lies on the x-y plane and passes along a point (x, y). This means that, if a plurality of points lying on a straight line in the x-y plane are transferred to the $\rho$-$\theta$ plane, they are transformed into a plurality of sine curves which intersect in a point. The inverse transformation of this point results in a straight line which lies on the x-y plane. Thus the method described by Duda and Hart makes it possible to detect a straight line from a plurality of points lying adjacent to one another in disorder.

The points A to D shown in FIG. 6A collinearly lie on a straight line LB1, a perpendicular drawn thereto from the origin making an angle of $\pi/4$ with the X axis. When these points are transferred to the $\rho$-$\theta$ plane, they are transformed into four sine curves which intersect in a point $\alpha$ as shown in FIG. 6B.

Likewise, the points E, B, F and G shown in FIG. 6A collinearly lie on a straight line LB2, a perpendicular drawn thereto from the origin making an angle of $\pi/2$ with the X axis. When these points are transferred to the $\rho$-$\theta$ plane, they are transformed into four sine curves which intersect in a point $\beta$ as shown in FIG. 6B.

Thus, it will be seen in FIGS. 6A and 6B that, if a plurality of points lying on a straight line which is parallel with or perpendicular to the X or Y axis in the x-y plane are transferred to the $\rho$-$\theta$ plane, they are transformed into a plurality of sine curves which intersect in a point, the $\theta$ coordinate of which is 0, $\pi/2$ or $\pi$. Conversely, if the $\theta$ coordinate of a point of intersection is found to be 0, $\pi/2$ or $\pi$ in the $\rho$-$\theta$ plane, the inverse transformation of this point of intersection into the x-y plane will result in a straight line of the kind indicated above.

An effective way of extracting a straight line in the x-y plane is to detect, from an original image, the positions of picture elements which seemingly correspond to the elements of the straight line being sought, find points which lie on the $\rho$-$\theta$ plane and correspond to the positions of the aforesaid picture elements, count the number of times each value of the $\theta$ coordinate occurs with respect to the points thus found, obtain the results of such counting in the form of a frequency distribution, find points having frequencies higher than a threshold frequency, and subject these points to inverse transformation by applying equation (1) to these points.

If the $\theta$ coordinate of one of the aforesaid points having frequencies higher than a threshold frequency is found to be $\pi/4$, the inverse transformation of this point into the x-y plane will result in a straight line such as the one designated as LB1 on which the points A to D collinearly lie as shown in FIG. 6A. The straight line LB1 enables the distance between, e.g., A and D to be calculated. In this manner, line segments having lengths in excess of a predetermined length can be extracted.

The manner in which the attribute corrector AM works will now be described.

Referring now to FIG. 7A, an original image RF appearing in the document DR (FIG. 1) consists of two regions A1 and A2 different in attributes from each other. FIG. 7B illustrates a typical result in the form of an attribute map MP1 obtainable when the attribute of each picture element is determined. In the attribute map MP1, white picture elements GA1 which are judged to fall under the region A1 are mixed with gray picture elements GA2 which are judged to fall under the region A2.

By the expression "noise," as used herein, is meant one region which overlap into the other region as shown in FIG. 7B. An attribute map MP2 shown in FIG. 7C results from the elimination of noise from the attribute map MP1. A substantial decrease in the number of boundary points attained by the elimination of noise makes it possible to greatly lessen the time required for arithmetic operations. A non-limiting example of noise is a region of lesser area than a predetermined size. Alternatively, the attribute map MP1 may be corrected on the basis of the number of identical attributes contained in a matrix of a predetermined size.

FIG. 8A is obtained when boundary points GB interposed between the regions A1 and A2 are extracted from the attribute map MP2 shown in FIG. 7C. Intrinsically, the boundary points GB fall under the region A2 as the picture elements GA2. The boundary points GB are blackened.

A Hough transform is applied to the boundary points GB. Line segments LB3 and LB4 having lengths in excess of a predetermined length are detected. FIG. 8B illustrates typical results obtained from such detection. The line segments LB3 and LB4 serve as border lines by which an area enclosed with the outer frame of FIG. 8B is divided into four rectangular local regions AL1 to AL4, in each of which the determination of attributes is carried out.

FIG. 8C is premised on an assumption that the picture elements GA1 are found to be a majority in the local regions AL1 and AL2, while the picture elements GA2 are found to be a majority in the local regions AL3 and AL4. On the basis of these findings, the local regions AL1 and AL2 are judged to fall under the region A1, while the local regions AL3 and AL4 are judged to fall under the region A2. The line segment LB3 separating the local regions AL1 and AL2 from the local regions AL3 and AL4 nearly coincides with a border line separating the region A1 from the region A2 in the original image RF. An effective way of determining the attribute of a local region AL is to count the number of times each of the picture elements GA1 and GA2 occurs in each local region AL, obtain the results of such counting in the form of a frequency distribution for each local region AL, and find a picture element GA having the highest frequency in each local region AL.

Figure 9B:
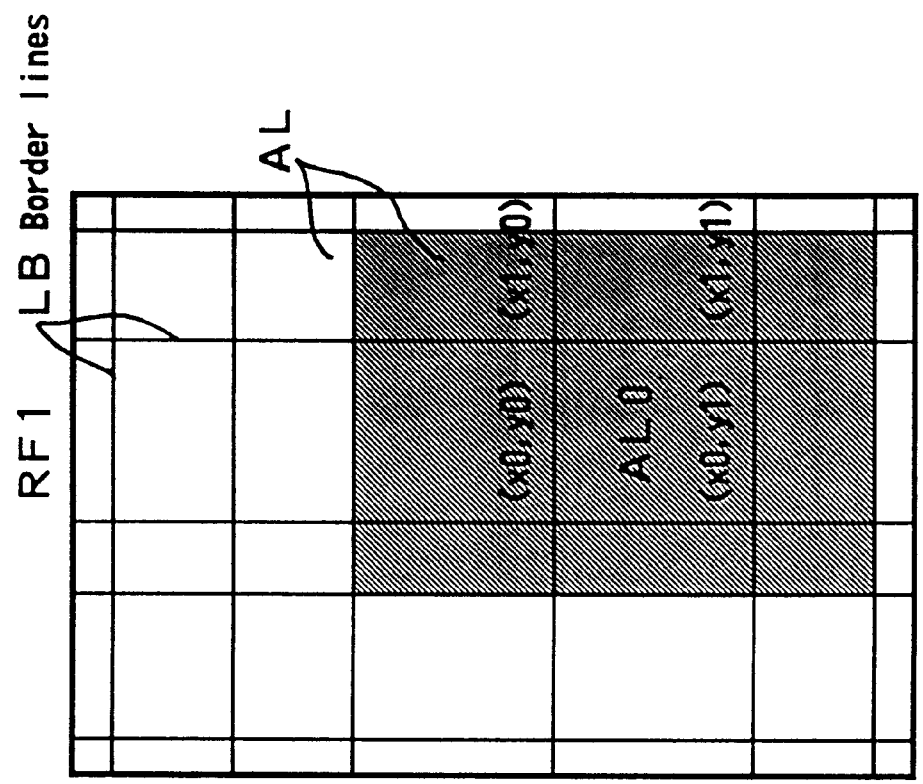
FIGS. 9A and 9B are views useful in understanding the method of dividing an image into a plurality of local regions.
Figure 9A:
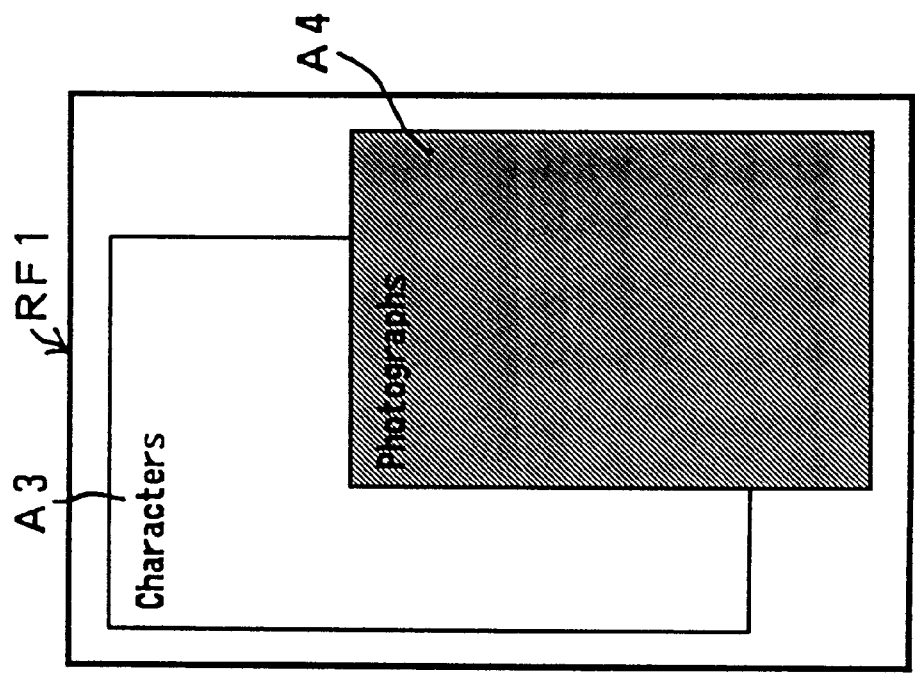
Figure 14:
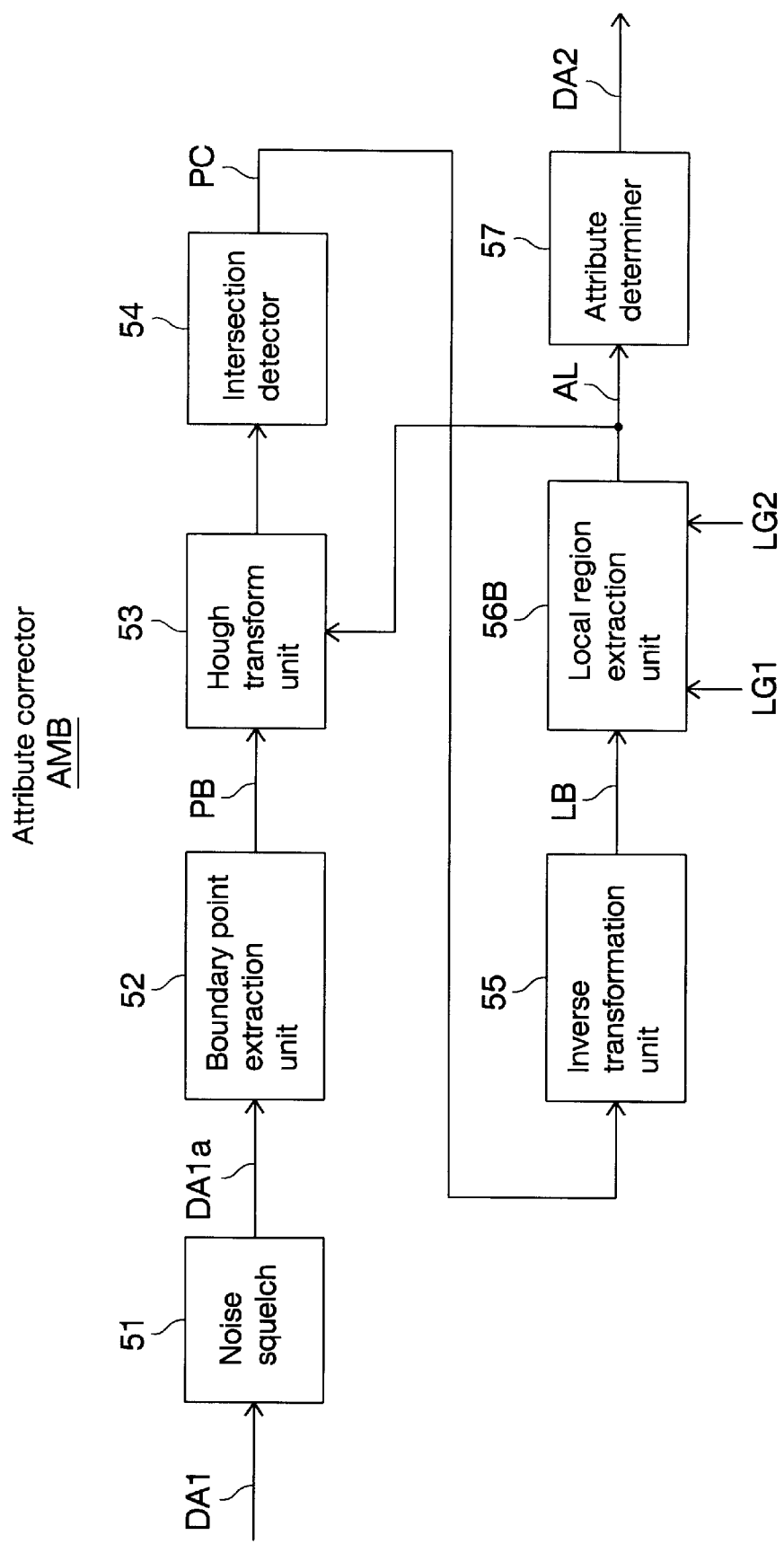
FIG. 14 is a block diagrammatic representation of a modified form of the attribute corrector.

The method of dividing the original image RF into a plurality of local regions AL will become more apparent as the following description proceeds:

An original image RF1 shown in FIG. 9A consists of a region A3 of characters and a region A4 of photographs. Border lines LB are obtained when the Hough transform has been applied to the original image RF1. As shown in FIG. 9B, the original image RF1 is divided into a plurality of local regions AL, each of which is enclosed with the border lines LB. Each of the border lines LB is obtained from the prolongation of a line segment having a length in excess of a predetermined length LG (FIG. 14).

By virtue of this method, respective regions can be correctly determined even if an original image RF consists of dots, characters and photographs. For the purpose of such determination, a Hough transform is applied to picture elements so that border lines LB by which one image is separated from another may be extracted. Thereby, each local region AL can be adequately subjected to image processing in accordance with an attribute prevailing in that local region.

Figure 11:
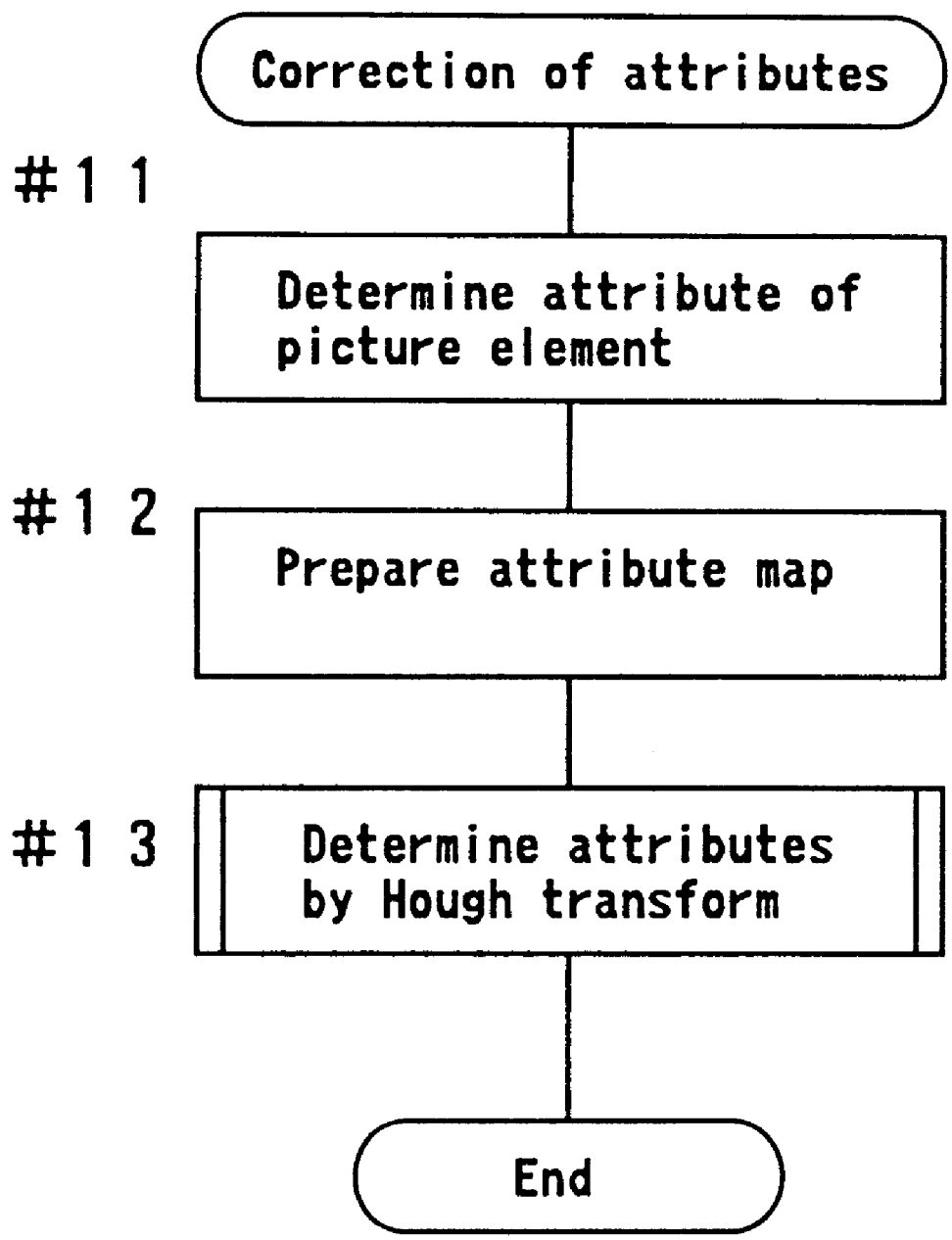
FIG. 11 is a flow diagram representing successive steps in typical processing carried out by the attribute corrector.
Figure 12:
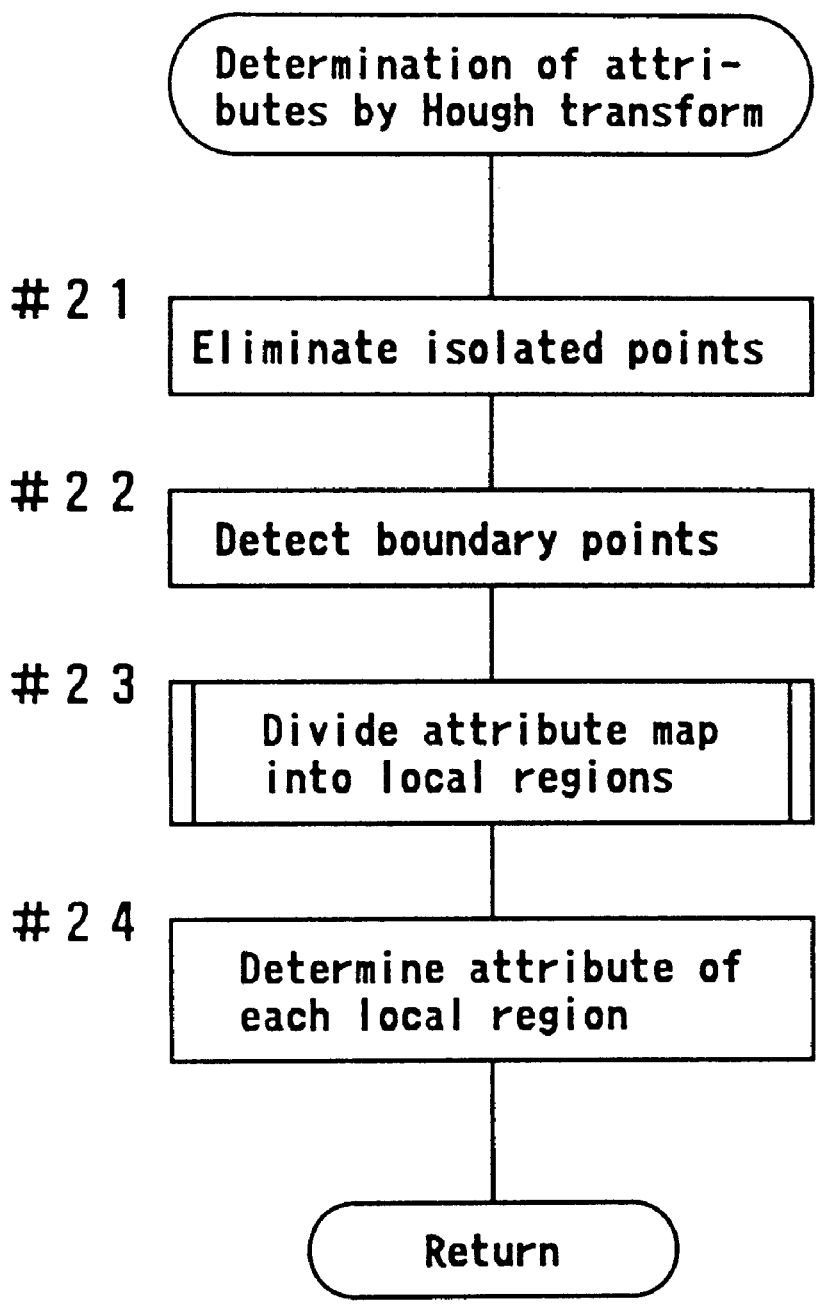
FIG. 12 is a detail showing a portion of FIG. 11 in connection with determination of attributes by a Hough transform.
Figure 13:
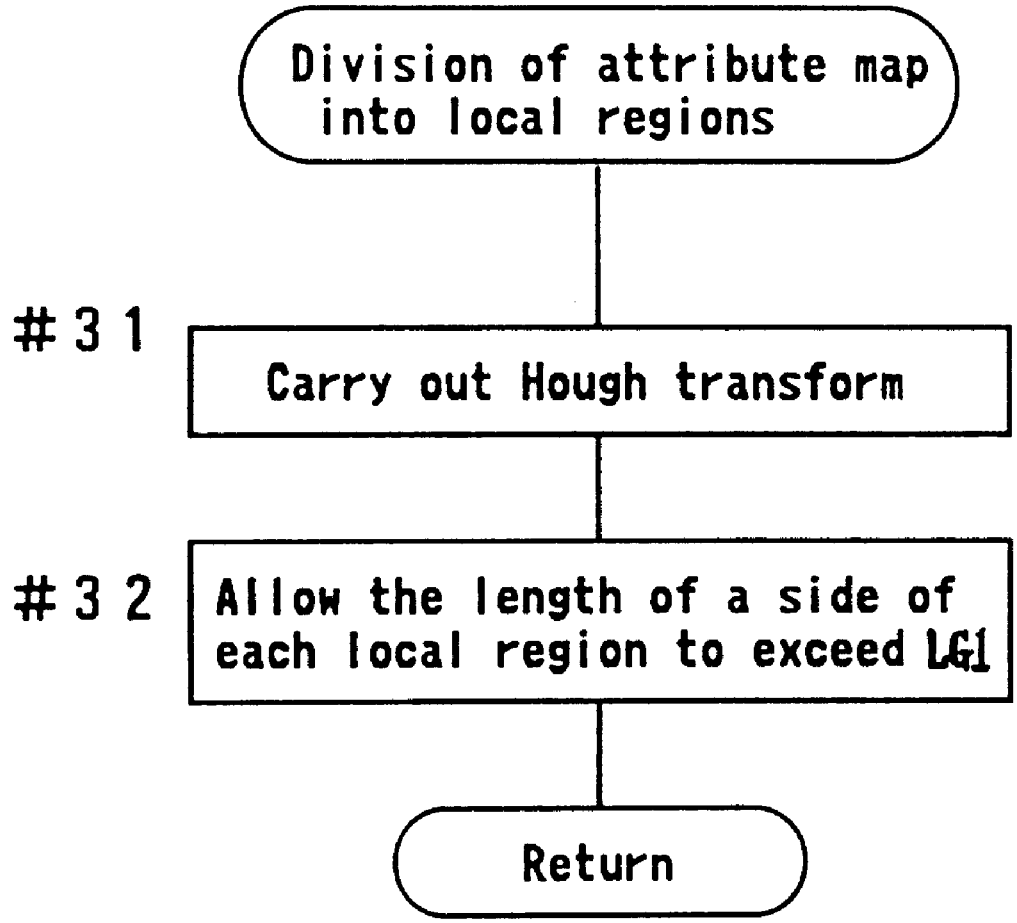
FIG. 13 is a detail showing a portion of FIG. 12 in connection with dividing an image into a plurality of local regions.

For a more complete understanding of the successive steps in correcting the attributes, reference may be had to FIGS. 11 to 13.

It will be seen from FIG. 11 that the correction of attributes begins with determining the attribute of each picture element (step 11). Then an attribute map MP is prepared (step 12), and the attributes of picture elements are determined by subjecting them to a Hough transform (step 13).

As will be seen in FIG. 12, noise in the form of isolated points is eliminated (step 21), and boundary points GB are detected (step 22). Then the attribute map MP is divided into a plurality of local regions AL (step 23), and the attribute of each local region AL is determined (step 24).

As will be apparent from FIG. 13, a Hough transform is carried out for the purpose of dividing the attribute map MP into a plurality of local regions AL (step 31). The length of a side of each local region AL is allowed to exceed a predetermined length LG1 (FIG. 14) (step 32).

Reference will now be had to a second preferred embodiment of the inventive image processor.

The second embodiment differs from the first embodiment by the fact that a local region AL is subdivided by an attribute corrector AMB. In other words, division is stageably repeated.

The manner in which a local region AL is subdivided will be most clearly understood upon a review of FIGS. 9B, 10A, and 10B, wherein it will be seen that a specific local region AL0 enclosed with border lines LB5 to LB8 and having corners $(x_0, y_0)$, $(x_0, y_1)$, $(x_1, y_1)$ and $(x_1, y_0)$ is subdivided into four subregions AL00, AL01, AL10 and AL11 as shown in FIG. 10B. For the purpose of such subdivision, a Hough transform is applied to the local region AL0 so that border lines LB9 and LB10 having lengths in excess of a predetermined length LG2 may be extracted.

For example, 1 cm may be acceptable as a predetermined length LG1 for LB5 to LB8. This value of LG1 is equivalent to about 150 dots under the condition that the image processor has a resolution of 400 dpi. In this case, the predetermined length LG2 for LB9 and LB10 should be less than 1 cm and greater than 30% of the length and the width respectively of the local region AL0. A value falling within a range between several millimeters and several centimeters may also be acceptable as the predetermined length LG1.

Now the attribute of a local region AL is determined. It will be seen from FIG. 10B that, in the effort to obtain the shortest possible time for arithmetic operations, the border lines LB9 and LB10 are made just long enough to subdivide the interior of the local region AL0 and are not allowed to extend to the interior of adjacent local regions which need not be subdivided.

To provide for the aforesaid subdivision, provision is made in this embodiment of a modified form 56B of the local region extraction unit 56 as shown in FIG. 14. In the modified local region extraction unit 56B, the extraction of local regions AL is effected with the predetermined length LG1 and then the extraction of subregions is effected with the predetermined length LG2.

Figure 15:
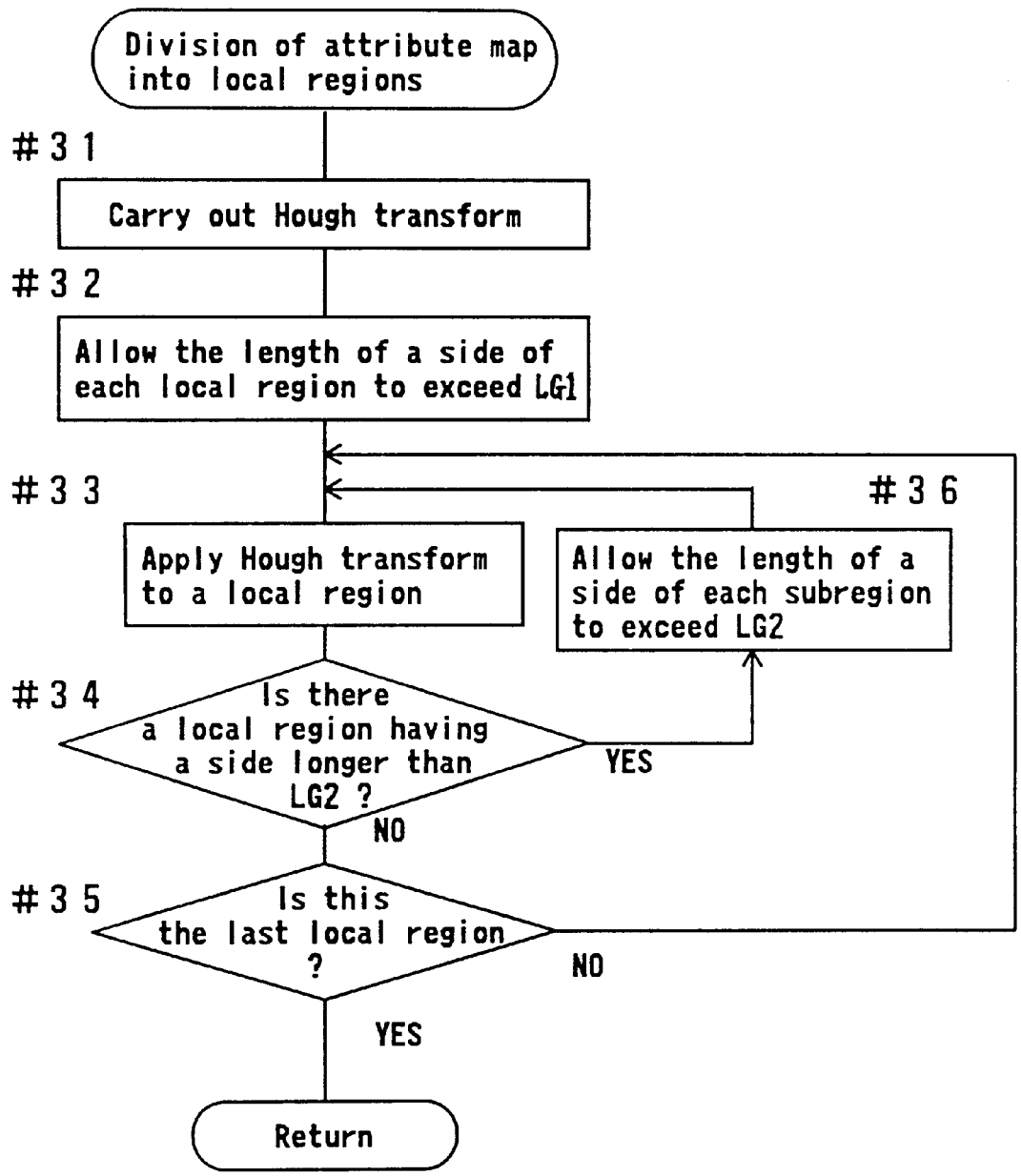
FIG. 15 is a similar diagram to that shown in FIG. 13, but showing the manner in which a local region is subdivided.

For a more complete understanding of the successive steps in the aforesaid extraction of local regions and subregions, reference may be had to FIG. 15. The extraction begins by carrying out a Hough transform (step 31), and the attribute map MP is divided into a plurality of local regions AL such that the length of a side of each local region AL is allowed to exceed a predetermined length LG1 (step 32). Then the Hough transform is applied to a local region AL (step 33), and this local region AL is divided into a plurality of subregions such that the length of a side of each subregion is allowed to exceed a predetermined length LG2, and the ratios the length and the width of each subregion bear to the length and the width respectively of the local region AL are higher than predetermined ratios (steps 34 and 36). The processing returns when the local region AL is precluded from being subjected to any further subdivisions (i.e., when an affirmative answer has been given in step 35).

Reference will now be had to a third preferred embodiment of the inventive image processor.

The third embodiment differs from the first embodiment by the fact that characters are subjected to processing other than a Hough transform in an attribute corrector AMC.

Figure 16:
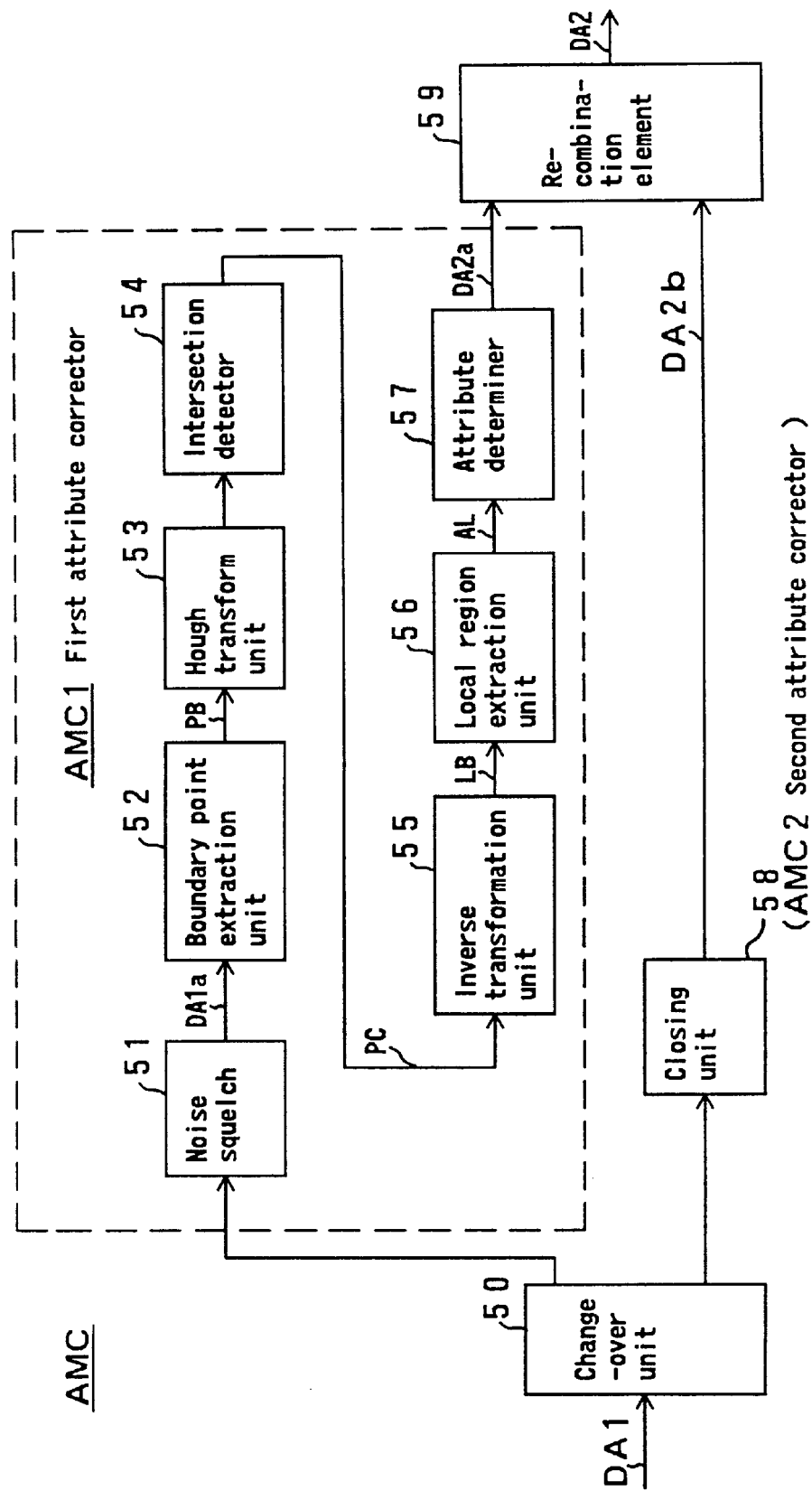
FIG. 16 is a block diagrammatic representation of an additional modified form of the attribute corrector.

As shown in FIG. 16, the attribute corrector AMC comprises a change-over unit 50, first corrector AMC1, second corrector AMC2 and recombination element 59. The first corrector AMC1 comprises a noise squelch 51, boundary point extraction unit 52, Hough transform unit 53, intersection detector 54, inverse transformation unit 55, local region extraction unit 56 and attribute determiner 57. The second corrector AMC2 consists of a closing unit 58.

In order to correct the information DA1 in accordance with the attribute of each picture element, the change-over unit 50 makes a switchover of connection from first corrector AMC1 to the second corrector AMC2 and vice versa according to whether the information DA1 concerns itself with characters or with dots or photographs. In case of characters, the second corrector AMC2 is selected. In case of dots or photographs, the first corrector AMC1 is selected.

The manner in which the first corrector AMC1 works is the same as the manner in which the attribute corrector AM incorporated in the first embodiment works. Information DA2$a$ is outputted from the first corrector AMC1.

The closing unit 58 concerns itself with closing, which is a kind of morphology and is effected with a disk filter which passes only image information of lesser area than, e.g., a 14-point type. The image is expanded and then contracted. Although not shown, the closing unit 58 comprises means for detecting a picture element having the highest photographic density from among picture elements disposed around a picture element in question, means for substituting the aforesaid highest photographic density for the photographic density of the picture element in question, means for detecting a picture element having the lowest photographic density from among picture elements disposed around another picture element in question, and means for substituting the aforesaid lowest photographic density for the photographic density of the picture element in question. Information DA2$b$ is outputted from the closing unit 58 when the information DA1 has been corrected thereby.

The two outputs DA2$a$ and DA2$b$ emerging from the first corrector AMC1 and the closing unit 58 respectively are recombined into information DA2 by the recombination element 59.

Figure 17:
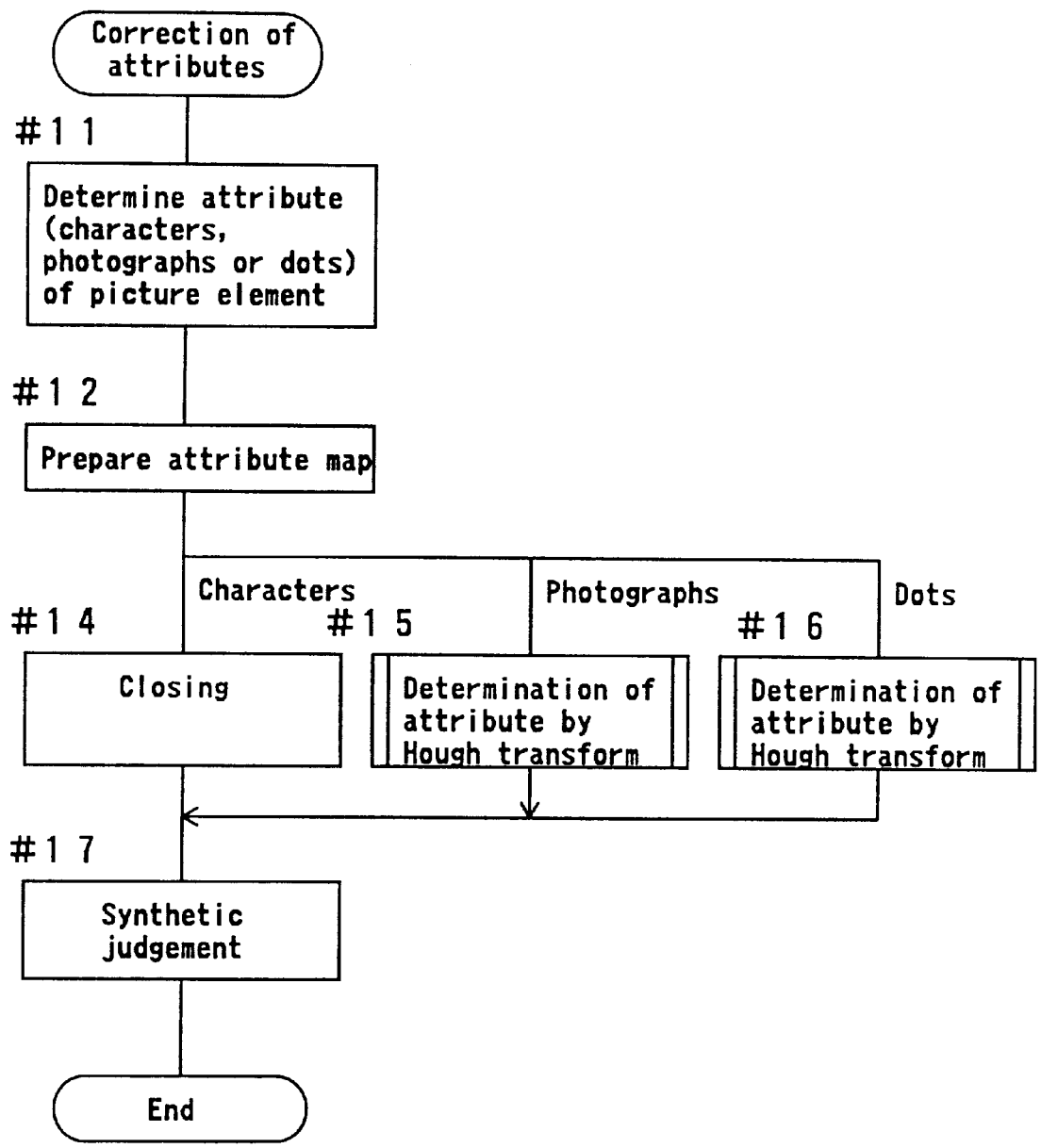
FIG. 17 is a similar diagram to that shown in FIG. 11, but showing an alternative manner of processing carried out by the attribute corrector.

For a more complete understanding of the foregoing, reference may be had to FIG. 17, in which the procedure begins with determining the attribute of each picture element (step 11). Then an attribute map MP is prepared for each attribute (step 12), i.e., for each of the candidate regions for dots, photographs and characters.

The attribute map MP prepared for the candidate region of characters is subjected to closing (step 14). The attributes of the attribute maps MP prepared for the candidate regions of dots and photographs are determined by subjecting them to a Hough transform (steps 15 and 16). When the entire process has been carried out, the three attribute maps MP are subjected to synthetic judgment and composition (step 17). When the three candidate regions are disposed in partially overlying relationship with respect to each other, composition is carried out in the order of, e.g., dots, photographs and characters, i.e., by priority of accuracy with which the attribute of each picture element is determined.

Hitherto, in determining the attribute of each picture element, hair in a photograph has frequently been mistaken for dots or characters, and a candidate region of characters has frequently been mistaken for a region containing dots or photographs. However, with the third preferred embodiment of the inventive image processor as hereinabove disclosed, a Hough transform is applied specifically to the candidate region of photographs and closing is applied specifically to the candidate region of characters to overcome the foregoing objectionable feature of the prior art image processors.

More specifically stated, in order to look for and locate characters, photographs and dots respectively, the attribute of each picture element is determined. Attribute maps MPC1, MPP1 and MPM1 prepared for the aforesaid three attributes respectively are corrected in such a manner as shown in FIG. 18.

Referring again to FIG. 17, the attribute map MPC1 is corrected by subjecting it to closing (step 14), while the attribute maps MPP1 and MPM1 are corrected by subjecting them to Hough transform (steps 15 and 16). Attribute maps MPC2, MPP2 and MPM2 resulting respectively from such correction are recombined into an attribute map MPT.

Figure 18:
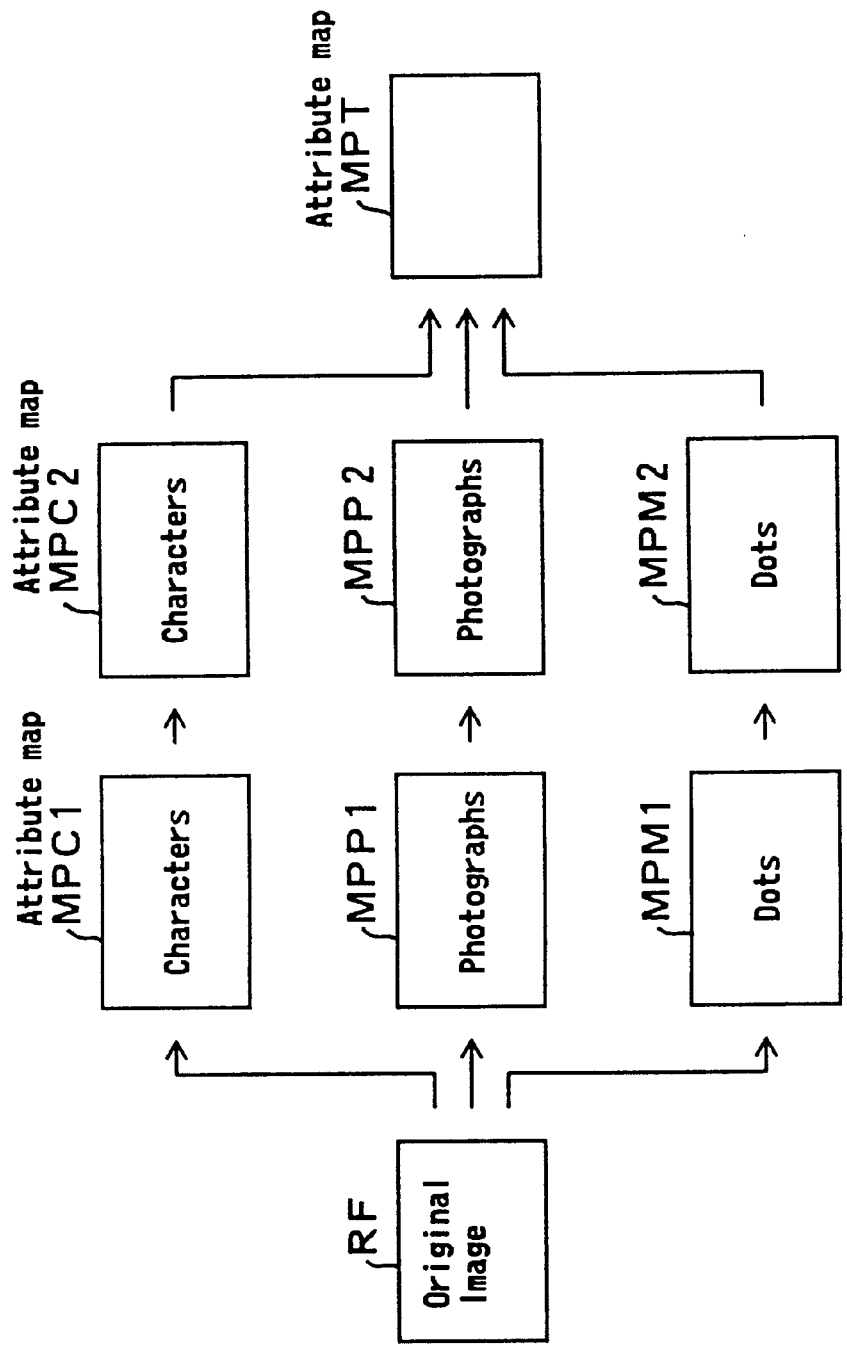
FIG. 18 is a detail showing a portion of FIG. 17 in connection with the manner in which attribute maps are corrected.
Figure 19C:
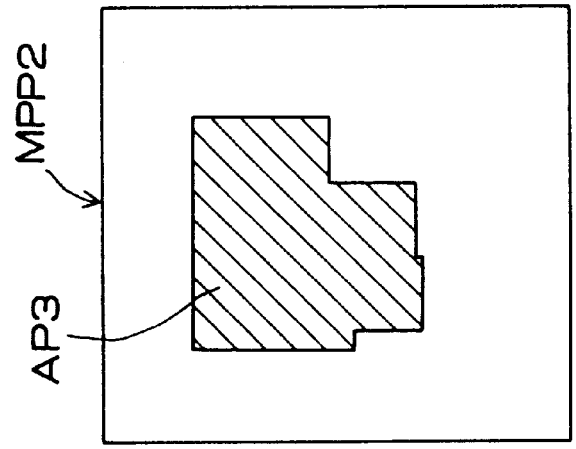
FIGS. 19A, 19B, and 19C are detail illustrations showing a portion of FIG. 18 in connection with the manner in which the candidate region of a photograph is corrected.
Figure 19B:
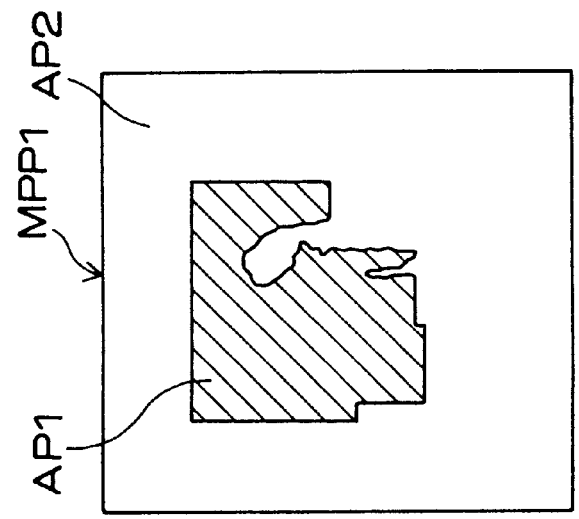
Figure 19A:
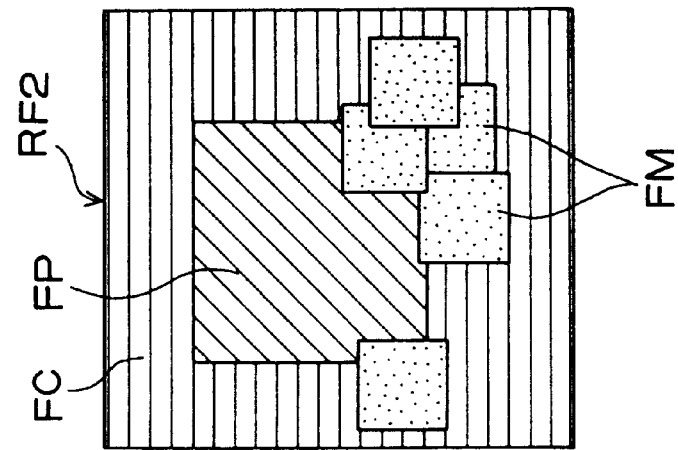

FIGS. 19A, 19B, and 19C are detail illustrations showing a portion of FIG. 18 in connection with the manner in which the candidate region of a photograph is corrected.

It will be seen from FIG. 19A that an original image RF2 has a photograph FP at its center. Arranged about the photograph FP is a region FC of characters. Regions FM of dots are disposed in partially overlying relationship with respect to each other and with respect to the photograph FP and the characters FC.

As will be seen in FIG. 19B, when the attribute of each picture element has been determined, the region AP1 for the photograph FP is extracted at the center of the original image RF2. The region other than the region AP1 is designated collectively as AP2. The region AP1 is smaller than a region which should be intrinsically occupied by the photograph FP. This is because the region AP2 partially encroaches thereon, and this encroachment results from the fact that the picture elements corresponding to the portion on which the region AP2 encroaches are mistaken for picture elements representing an attribute or attributes other than the photograph FP.

As will be apparent from FIG. 19C, the portion on which the region AP2 has encroached is restored to the intrinsic condition when the region which should be intrinsically occupied by the photograph FP has been subjected to a Hough transform for the correction of attributes. A region AP3 resulting from this correction nearly coincides with the region which should be intrinsically occupied by the photograph FP.

Although not shown in the drawing, it will be understood that the manner in which the attribute maps MPC2 and MPM2 (FIG. 18) are extracted is similar to that described above with reference to the attribute map MPP2. The attribute map MPM2 nearly coincides with the regions FM of dots shown in FIG. 19A. In case of the attribute map MPC2, the degree of coincidence with the region FC of characters is lower than the case of the attribute maps MPP2 and MPM2 nearly coinciding with the region FP of the photograph and the regions FM of dots respectively. At the time of recombining the three attribute maps into an attribute map MPT, such a difference in the degrees of coincidence is taken into account such that, at the beginning of recombination, regions are kept for the dots and photograph in this order and, thereafter, the remaining region is allotted to characters.

It will be appreciated that, in addition to those obtainable from the first embodiment, further advantages are obtained from the third embodiment as follows: By virtue of closing applied specifically to the candidate region of characters, the possibility of mistaking this region for a region containing dots or photographs is minimized or eliminated. Thereby, picture quality is prevented from being deteriorated and a speedup in data processing is attained. The reason for dividing the original image RF into a plurality of rectangular local regions AL is that there are many cases where the regions of dots and photographs are rectangular. The rectangularity of the local regions AL makes it possible to correctly determine them to such an extent that noise is minimized. A particular advantage obtainable from the exclusion of the region of characters from the application of a Hough transform resides in the fact that the quantity of data to be processed can be minimized so as to allow a speedup in data processing to be attained.

As has been above explained, a function peculiar to the attribute corrector AMB incorporated in the second embodiment is to subdivide a local region AL into a plurality of subregions. This function may be added to the attribute corrector AMC incorporated in the third embodiment so as to allow it to carry out the function shown in FIG. 15 in addition to its intrinsic function. Changes in the construction of several parts and the data processing system design may be made without departing from the nature and principle of the invention.

What is claimed is:

1. A method of processing image data representing a plurality of picture elements, said method comprising the steps of:

extracting feature information of each picture element from corresponding image data;

determining an attribute of said each picture element on the basis of the feature information of the respective picture element;

detecting straight lines by applying a Hough transform to image data representing picture elements disposed along apparent border lines by which one attribute is divided from another;

dividing said image data into a plurality of local regions by said straight lines;

determining an attribute with respect to each of said plurality of local regions; and subjecting each of said plurality of local regions to image processing in accordance with the attribute determined with respect to the respective local region.

2. A method as defined in claim 1, wherein said step of determining an attribute with respect to each of said plurality of local regions is implemented on the basis of the attribute determined with respect to image data corresponding to each picture element contained therein.

3. A method as defined in claim 1, further comprising a step of eliminating noise from a result of said step of determining the attribute of said each picture element prior to said step of detecting straight lines.

4. A method of processing image data representing a plurality of picture elements, said method comprising the steps of:

extracting feature information of each picture element from corresponding image data;

determining an attribute of said each picture element on the basis of the feature information of the respective picture element;

dividing said image data into a plurality of rectangular local regions by applying a Hough transform to image data representing said each picture element on the basis of the attribute of said each picture element, each of said plurality of rectangular local regions having a side such that a length thereof falls within a predetermined range;

determining an attribute with respect to each of said plurality of rectangular local regions; and subjecting each of said plurality of rectangular local regions to image processing in accordance with the attribute determined with respect to the respective rectangular local region.

5. A method as defined in claim 4, wherein said dividing step is stageably repeated.

6. A method as defined in claim 4, wherein said step of determining an attribute with respect to each of said plurality of rectangular local regions is implemented on the basis of the attribute determined with respect to image data corresponding to each picture element contained therein.

7. A method of processing image data representing a plurality of picture elements, said method comprising the steps of:

extracting feature information of each picture element from corresponding image data;

determining an attribute of said each picture element on the basis of the feature information of the respective picture element so as to produce attribute information on the attribute of said each picture element;

dividing each of regions of dots and regions of photographs on the basis of said feature information into a plurality of local regions by applying a Hough transform to said regions of dots and said regions of photographs, and correcting said feature information by determining an attribute with respect to the respective local region;

correcting said feature information by applying processing other than said Hough transform to a region of characters on the basis of said feature information; and subjecting each of said regions of dots, said regions of photographs, and said region of characters to image processing in accordance with respective attribute information on the basis of said corrected feature information.

8. A method as defined in claim 7, wherein said processing other than said Hough transform is closing.

9. A method as defined in claim 7, wherein, in said dividing step, each of the regions of dots and the regions of photographs is repeatedly divided into the plurality of local regions by repeatedly applying said Hough transform to said regions of dots and said regions of photographs.

10. A method as defined in claim 7, wherein, in said dividing step, said feature information is corrected by determining the attribute with respect to the respective local region on the basis of the attribute determined with respect to image data corresponding to each picture element contained therein.

11. A method of determining attributes of local regions constituting image data representing a plurality of picture elements, the method comprising the steps of:

determining an attribute of each picture element from corresponding image data;

extracting boundary points disposed along an apparent border line by which one attribute is divided from another in an orthogonal coordinate plane;

applying a Hough transform to said boundary points so as to allow a plurality of curves in a polar coordinate plane to result from said Hough transform;

detecting points of intersection in which said plurality of curves intersect;

inversely transforming said points of intersection into points in said orthogonal coordinate plane so as to produce border lines therein;

extracting local regions corresponding to image data enclosed with said border lines; and determining an attribute with respect to each of said local regions.

12. An apparatus for processing image data comprising:

an extractor for extracting feature information of each picture element from corresponding image data;

a determiner for determining an attribute of said each picture element on the basis of the feature information of the respective picture element;

a corrector for detecting straight lines by applying a Hough transform to image data representing picture elements disposed along apparent border lines by which one attribute is divided from another, for dividing said image data into a plurality of local regions by said straight lines, and for determining an attribute with respect to each of said plurality of local regions; and a revise unit for subjecting each of said plurality of local regions to image processing in accordance with the thus determined attribute with respect to the respective local region.

13. An apparatus as defined in claim 12, wherein said corrector comprises:

an extractor for extracting boundary points disposed along said apparent border line by which one attribute is divided from another in an orthogonal coordinate plane;

a convertor for applying said Hough transform to said boundary points so as to allow a plurality of curves in a polar coordinate plane to result from said Hough transform;

a detector for detecting points of intersection in which said plurality of curves intersect;

an invertor for inversely transforming said points of intersection into points in said orthogonal coordinate plane so as to produce border lines therein;

an extractor for extracting said plurality of local regions corresponding to image data enclosed with said border lines; and a determiner for determining an attribute with respect to each of said plurality of local regions.

14. An apparatus as defined in claim 12, wherein said corrector is operable such that the attribute of each of the plurality of local regions is determined on the basis of the attribute determined with respect to image data corresponding to each picture element contained therein.

15. An apparatus as defined in claim 12, further including a noise eliminator for eliminating noise from a result obtained from determining the attribute of said each picture element, said elimination of noise being effected prior to the detection of straight lines by said corrector.

16. An apparatus for processing image data comprising:

an extractor for extracting feature information of each picture element from corresponding image data;

a determiner for determining an attribute of said each picture element on the basis of the feature information of the respective picture element;

a divider for dividing said image data into a plurality of rectangular local regions by applying a Hough transform to image data representing said each picture element on the basis of the attribute of said each picture element, each of said plurality of rectangular local regions having a corresponding side thereof such that a length thereof falls within a predetermined range;

a determiner for determining an attribute with respect to each of said plurality of rectangular local regions; and a revise unit for subjecting each of said plurality of rectangular local regions to image processing in accordance with the attribute thus determined with respect to the respective local region.

17. An apparatus as defined in claim 16, wherein said divider is adapted to stageably repeat dividing said image data.

18. An apparatus as defined in claim 17, wherein upon first dividing of said image data, said divider divides said image data into said plurality of rectangular local regions, said corresponding side thereof having a length greater than predetermined length (LG1), wherein upon second dividing of said image data, said divider divides said plurality of rectangular local regions into a plurality of subregions, a corresponding side thereof having a length greater than predetermined length (LG2), wherein a ratio of a length of a side of one of said plurality of rectangular local regions to a length of a side of a respective one of said plurality of subregions is greater than a predetermined ratio, and wherein said predetermined length (LG1) is greater than said predetermined length (LG2).

19. An apparatus for processing image data comprising:

an extractor for extracting feature information of each picture element from corresponding image data;

a determiner for determining an attribute of said each picture element on the basis of the feature information of the respective picture element so as to produce attribute information on the attribute of said each picture element;

a first corrector for correcting said feature information by detecting straight lines by applying a Hough transform to image data representing picture elements disposed along apparent border lines by which one attribute is divided from another, dividing said image data into a plurality of local regions by said straight lines, and for determining an attribute with respect to each of said plurality of local regions;

a second corrector for correcting said feature information by applying a processing other than a Hough transform;

a selector for selecting one of said first corrector and said second corrector so that said feature information can be corrected in accordance with the attribute information of a corresponding picture element on the basis of said feature information; and a revise unit for subjecting each of said plurality of local regions to image processing in accordance with corresponding attribute information on the basis of said corrected feature information.

20. An apparatus as defined in claim 19, wherein said selector is adapted for operating such that said first corrector is selected for regions of dots and regions of photographs while said second corrector is selected for regions of characters.

21. An apparatus as defined in claim 19, wherein said first corrector comprises:

an extractor for extracting boundary points disposed along said apparent border line by which one attribute is divided from another in an orthogonal coordinate plane;

a convertor for applying said Hough transform to said boundary points so as to allow a plurality of curves in a polar coordinate plane to result from said Hough transform;

a detector for detecting points of intersection in which said plurality of curves intersect;

an invertor for inversely transforming said points of intersection into points in said orthogonal coordinate plane so as to produce actual border lines therein;

an extractor for extracting said plurality of local regions corresponding to image data enclosed with said actual border lines; and a determiner for determining an attribute with respect to each of said plurality of local regions.

22. An apparatus as defined in claim 19, wherein said second corrector comprises:

a detector for detecting a picture element having a highest photographic density from among picture elements disposed around a first picture element;

a replacer for substituting data corresponding to said highest photographic density for data corresponding to a photographic density of the first picture element;

a detector for detecting a picture element having a lowest photographic density from among picture elements disposed around a second picture element; and a replacer for substituting data corresponding to said lowest photographic density for data corresponding to a photographic density of the second picture element.

* * * * *